July 13, 1965    T. J. WEIR    3,194,372
VARIABLE VOLUME COUPLING MECHANISM
Filed March 6, 1963    2 Sheets-Sheet 2

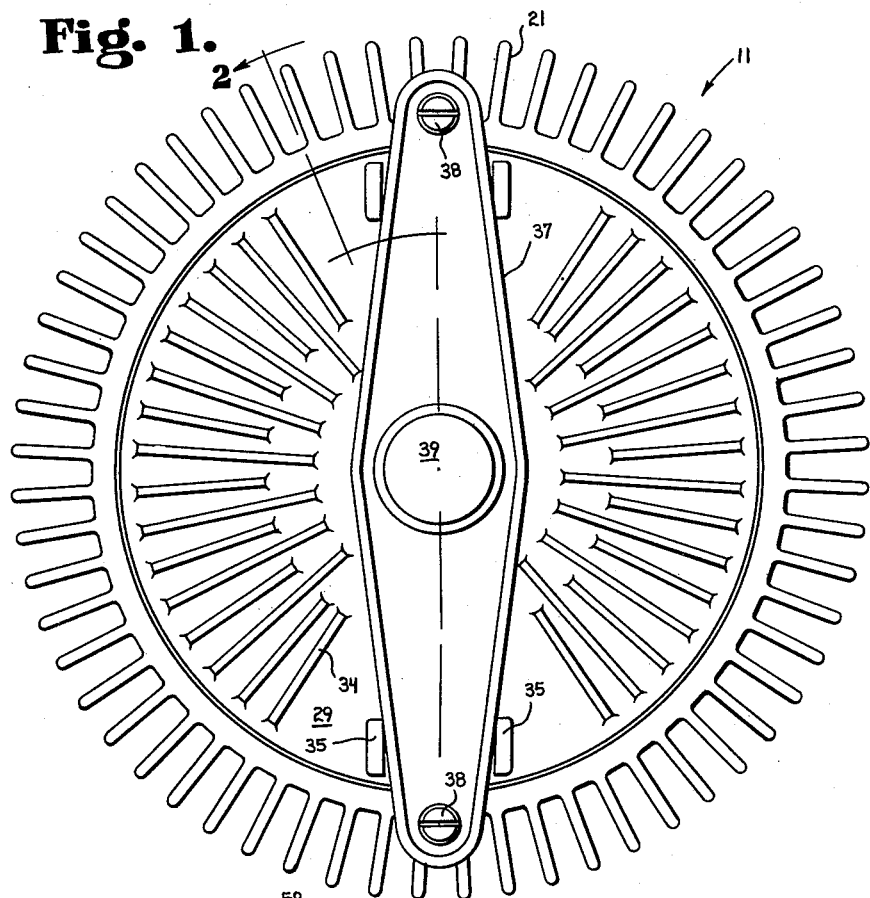

INVENTOR.
THOMAS J. WEIR
BY
Lockwood, Woodard, Smith & Weikart
Attorneys

United States Patent Office 3,194,372
Patented July 13, 1965

3,194,372
VARIABLE VOLUME COUPLING MECHANISM
Thomas J. Weir, Indianapolis, Ind., assignor to Schwitzer Corporation, Indianapolis, Ind., a corporation of Indiana
Filed Mar. 6, 1963, Ser. No. 263,154
2 Claims. (Cl. 192—58)

This invention relates to a fluid coupling for driving accessory devices such as are commonly associated with an internal combustion engine or any similar driving means. Such devices, for example, may include a radiator cooling fan, electric generator, air conditioner compressor or water pump.

Generally speaking, the power consumed by such accessories increases as the speed of the engine or driving means increases, but in many instances the demand for the useful output of such a driven appliance, beyond a certain maximum speed, increases, if at all, at a rate much less than that resulting from the increase in speed of the driving means or engine. A notable example of this condition is the radiator cooling fan. If such accessory is coupled directly to the engine, the power consumed thereby increases approximately as the cube of the engine speed increase, whereas the necessary speed for the fan, as an agency for inducing heat-exchanging air flow through the radiator, in most cases does not increase in proportion to the engine speed.

It is, therefore, an object of this invention to provide in an accessory-driving mechanism, a slippable coupling which will operate automatically with increase slippage as the driving or engine speed increases, thereby avoiding unnecessary speed and power consumption by the driven accessory.

Another object of the invention is to produce a coupling in which slipping can be controlled in response to changes of temperature of a medium external to the coupling.

Another object is to provide a coupling mechanism in which a nominal size, particularly in radial dimensions, can be maintained and yet comparatively large torque transmission capacity is achieved.

In a typical embodiment of the present invention, there is provided a fluid coupling of the fluid shear type comprising a driving member and a driven member mounted together for relative rotation therebetween. One of the members is generally in the form of a casing whereas the other member is in the form of a rotor mounted by a suitable bearing in the casing. The rotor and casing have facing walls in spaced relation and the casing has a movable wall therein to provide a variable volume fluid reservoir.

A temperature sensitive actuator is mounted to the casing externally thereof and includes a movable element engaging the movable wall of the casing to change the volume of the reservoir in response to external air temperature changes. The arrangement is such that increases of external air temperature move the drive fluid from the reservoir into the space between the facing surfaces of the rotor and casing. Therefore, if either the rotor or casing is being driven by a source of power, a fluid shear relationship will be established between the facing surfaces of the rotor and casing whereby torque transmission is effected.

The arrangement of the facing surfaces of the rotor and casing is such that a maximum area of fluid shearing surface is achieved in a rather nominal radial dimension. The amount of fluid in shear is varied by movement of the movable wall in response to temperature changes, to vary the speed ratio between the driving member and the driven member. Means are provided in the coupling mechanism to achieve the desired speed of response to variations in external temperature.

The full nature of the invention will be understood from the accompanying drawings and the following description and claims:

FIG. 1 is a front elevation of a typical embodiment of the invention.

FIG. 3 is a rear elevation of the rotor employed in the typical embodiment.

Figure 2:
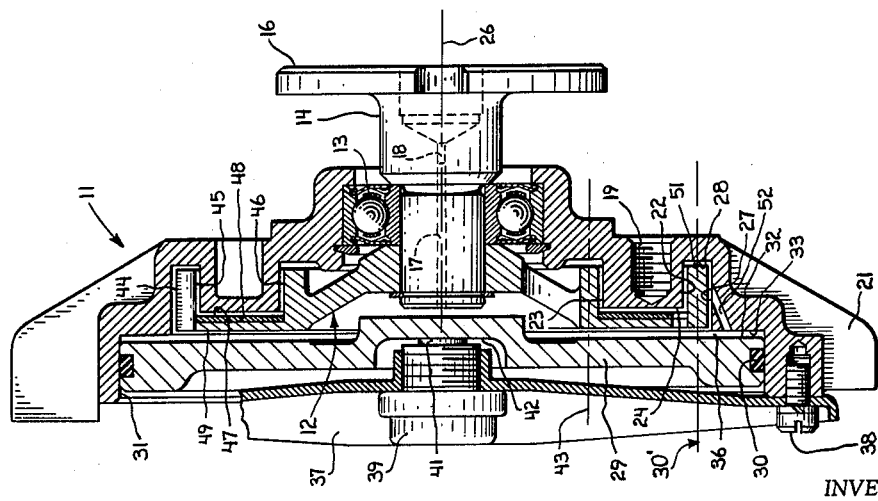
FIG. 2 is a section taken along the line 2—2 in FIG. 1.

Referring to the drawings, and particularly to FIGS. 1 and 2 thereof, a circular casing or housing 11 is provided and has mounted therein a rotor 12 which is supported in the casing by the single row sealed ball bearing 13. While either the casing or rotor could be used as the driving member, it will be assumed for the purposes of this description that the rotor is the driving member and that the casing is the driven member.

The rotor 12 is press fit on the hub 14, the latter having a flange 16 by which it may be mounted to a pulley, belt driven by an internal combustion engine for example. A hole 17 is provided in the hub and has a porous plug 18 at the outer end thereof to permit flow of air into and out of a portion of the coupling as will become apparent. The porous plug 18 prevents contamination and leakage of fluid from the coupling.

The housing 11 is provided with a plurality of threaded bolt holes 19 by which an engine cooling fan can be attached to the housing. It should be understood, of course, that the present coupling has many applications other than as a cooling fan drive coupling. An array of cooling fins 21 is provided in the housing to adequately dissipate heat generated therein by slippage.

The casing is provided with first and second coaxial cylindrical surfaces 22 and 23 respectively with a planar surface 24 disposed therebetween and normal to the axis 26 of relative rotation between the parts. A third cylindrical surface or wall 27, coaxial with the first and second surfaces, is provided in the casing and a planar surface 28 extends between surfaces 22 and 27 and lies perpendicular to the axis 26.

A circular plate 29 is mounted in the circular recess 21 of the housing and is sealed thereto by the O-ring seal 30. The plate is movable in the housing from the position shown in FIG. 2 to a position wherein the flat inner surface 32 thereof lies in abutting engagement with the flat surface 33 of the housing. This plate is provided with an array of radially extending fins 34 to dissipate heat generated in the coupling by slippage.

A viscous fluid is provided in the coupling, the fluid being of the type commonly used in fluid shear couplings and well known in the art. The amount of fluid used in the coupling will, of course, depend on the size of the coupling but usually is of such amount that when the coupling is at rest the level of the fluid will be below the axis 26. Also, the amount is such that when the movable pressure plate 29 is in the position shown in FIG. 2, and the casing and rotor are spinning fast enough to hold the fluid outwardly by centrifugal force, the level of the fluid would lie slightly inwardly radially of the cylindrical surface 27 at a location designated generally by the dotted line 30'. Thus, it is seen that when the pressure plate is in the position shown, the bulk of the fluid will be in the space 36 between the surface 32 of the plate and the surface 33 of the housing.

To provide means for moving the pressure plate 29 inwardly or toward the rear of the housing, a pressure strip or bridge 37 is secured to the housing by some suitable means such as screws 38. A thermal element 39 is secured to the pressure strip 37 and has a plug 41 therein engaging the surface 42 of the pressure plate 29. The thermal element may be any one of a number readily available and known in the art and, being positioned as shown, is responsive to increases of temperature of the air in front of the housing to extend the plug 41 from the body of the thermal element. This drives the pressure plate 29 toward the rear of the housing 11. This is effective to move the fluid from the space 36 inwardly to the extent that it is in contact with the cylindrical surfaces 23, 22 of the housing as well as surface 27. In fact, when the pressure plate is moved fully inwardly to abutment, the level of the fluid is such as is indicated by the dotted line 43. Thus, it is seen that the pressure plate functions as a movable bulkhead for the fluid.

Referring to FIG. 3 along with FIGS. 1 and 2, it will be seen that the rotor 12 includes first, second and third coaxial cylindrical surfaces 44, 45 and 46, respectively. Each of these surfaces is in facing spaced relation to one of the three aforementioned cylindrical surfaces of the housing. Accordingly, when the pressure plate moves the oil level into the position designated by the dotted line 43, fluid shear coupling is effected between each pair of facing cylindrical surfaces.

A planar surface 47 is provided between the cylindrical surfaces 45 and 46 of the rotor and is usually provided on a friction material 48 bonded to the rotor. A parallel planar surface 49 is provided on the front of the rotor 12. The facing surfaces 47 of the rotor and 24 of the casing also provide fluid shearing action contributing to the torque transmission between the rotor and casing. Face 32 and face 49 of the pressure plate and rotor respectively also contribute to the fluid shearing action, the amount of contribution depending on the spacing between the faces and the fluid level. Additional fluid shearing is achieved between the surface 28 of the housing and the surface 51 of the rotor. Thus, it is seen that torque transfer takes place on all surfaces of the drive disc which are exposed to the fluid.

Thus, it is seen that fluid shearing is achieved over a much greater total area than is normally achieved in conventional fluid shear couplings. Also, the amount of fluid shearing is variable with the temperature of the air outside of the coupling as sensed by the thermal element 39. As the temperature increases, the fluid is moved out of the space 36 in increasing amounts to place more fluid in shearing action between the facing surfaces of the rotor and housing. This increases the torque transmitted from the rotor to the housing to speed up the housing.

It will be observed that a drain hole 52 is shown in FIG. 2. Other drain holes equally spaced are provided as required. Also, three drain holes 54 are provided in the rotor as shown. Flow passages 56 are cut or embossed in the friction material in three places and converge to the drain holes 54. The passages 56, being triangular in shape, having the trailing edge 57 thereof radial and the leading edge 58 thereof on a tangent with the cylindrical surface 46. Also, it will be observed that a pair of slots 59 is provided in the outer cylindrical flange of the rotor.

When the rotor is moving in rotation with respect to the housing, which is essentially all of the time but in varying degrees, the leading edge of the passage 56 produces a wiping action and, together with the centrifugal force due to the speed of the rotor, produces a force in the passage moving the fluid outwardly, tending to move the fluid into the space 36 between the face 32 and face 33 of the pressure plate and housing respectively. The effect of the slots 59 in the rotor is also to tend to move the fluid into the space 36. Therefore, as air temperature external to the coupling decreases, the plug 41 of the thermal element retracts, and the centrifugal force applied to the fluid moves the pressure plate forwardly away from face 33 of the housing as fluid fills the space 36.

It should be noted at this point, that where only one bearing is used, as in the illustrated example, though the bearing is used to control both the radial and axial relationship between the rotor and housing, the friction material provides a safety measure to prevent galling between the housing and the rotor. In an embodiment where the friction material is not used, the above described passageways 56 could be cast or machined in the drive rotor.

In operation of the present invention, the temperature responsive device responds to changes in external air temperature to which it is subjected. It either extends the plug 41 toward the rear of the coupling mechanism as higher temperatures are detected, or allows return of the plug toward the forward end of the thermal element as decreasing temperatures are sensed. Accordingly, where the coupling mechanism is located behind the engine cooling system radiator of a motor vehicle, for example, changes in the temperature of air flowing out of the radiator will effect the thermal element. Increases in temperature will move the plug 41 to the rear and accordingly move the pressure plate 29 rearwardly.

Assuming first that the radiator air outlet temperature is comparatively low, there is no need for the engine cooling fan mounted to the coupling housing to move air through the radiator. Therefore, a low speed of the housing is acceptable and will minimize engine power consumption attributable to the fan. In this condition, the rotor, being driven by the engine through a pulley, for example, will change in speed as the engine speed changes. However, by reason of the fact that the pressure plate 29 is away from the face 33 of the housing, the fluid in the housing will tend to remain in the space 36 radially outwardly of the line 30'. This is due partially to the vanes or grooves 59 in the rapidly turning rotor and also due partially to the rotation of the housing caused by some fluid shearing between the facing cylindrical surfaces 27 and 44 of the housing and rotor respectively. This will be sufficient to keep the housing turning, though at a much reduced speed as compared to that of the drive motor.

During the aforementioned condition, heat generated in the coupling due to the slight shearing action is dissipated by the fins on the pressure plate and the housing.

Now, assuming that the engine coolant temperature has increased resulting in an increase in temperature of the air flowing out of the radiator, the thermal element will respond to the increased temperature and move the pressure plate toward the rear of the coupling. The extent of movement will, of course, depend on the temperature. As the pressure plate moves toward the rear of the housing, fluid is squeezed inwardly from between the faces 32 and 33 so that more of the facing surfaces of the rotor and housing are contacted by the fluid. Accordingly, the amount of fluid in shear is increased and the speed of the housing increases. As the housing speed increases, the fan speed increases to increase the flow of air through the radiator for the purpose of offsetting the increased temperature of air flowing out of the radiator.

As long as the temperature of the air flowing out of the radiator continues to increase, the pressure plate will continue to be moved until the face 32 thereof is in abutting relation with the face 33 of the housing, whereupon all of the fluid will have been moved out of the space 36 (which has been reduced to zero volume) and the maximum amount of fluid in shear can be obtained. In fact, under these circumstances, virtually no slip takes place between the driving and driven elements, thus approaching a locked up drive condition, the action approaching that of a wet clutch. However, the pressure plate can never advance to the point where it forces the friction material on the rotor to engage with the facing surface in the housing. This is because the pressure plate travel is limited by the face 33 of the housing.

As the temperature of air flowing out of the radiator decreases, the plug 41 can retract toward the front of the thermal element. Centrifugal force tends to drive the fluid out between faces 32 and 33 to open up the space 36 to its original volume. This it does by forcing the pressure plate 29 away from the face 33 as additional fluid moves between the faces. When the original volume of space 36 is again achieved, the only fluid which can possibly be in shearing action is that remaining between the wall 27 of the housing and the wall 44 of the drive disc. Thus, the torque transfer will be at a minimum and housing speed drops.

The passages 56 in the drive rotor, the grooves 59 in the drive rotor, and the drain holes 52 in the housing expedite the flow of fluid into the space 36. Thus, the response of the unit to decreases in external air temperature is rapid. Accordingly, fan noise and power consumption are reduced as the housing speed decreases when the amount of fluid in shear decreases as the fluid moves into the space 36.

By employing cylindrical fluid shearing surfaces, the present invention provides a large area of fluid in shear at the maximum available radial distance from the axis of rotation of the parts. Thus, for a given capacity, the physical size of the coupling, particularly in radial dimension, can be kept at a minimum. Also, by using a rather viscous fluid, the capacity can be high and yet the physical size minimized. The aforementioned passages, grooves and holes, assist the flow of a viscous fluid from the working area to the storage area and increase the response of the coupling to changes in control temperature.

Since the flow of the fluid back and forth changes the volume of the coupling enclosed by the housing and pressure plate, the vent hole 17 in the rotor drive shaft allows movement of air in and out as the pressure plate moves out and in. The porous plug 18 prevents loss of fluid and entry of foreign matter, while accommodating the flow of air.

Figure 5:
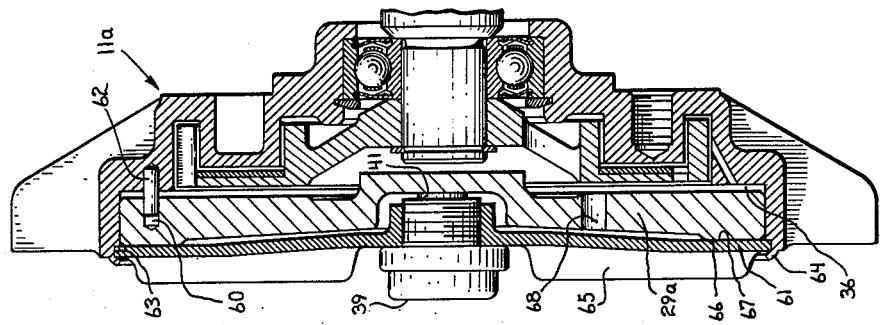
FIG. 5 is a section taken along the line 5—5 in FIG. 4.
Figure 4:
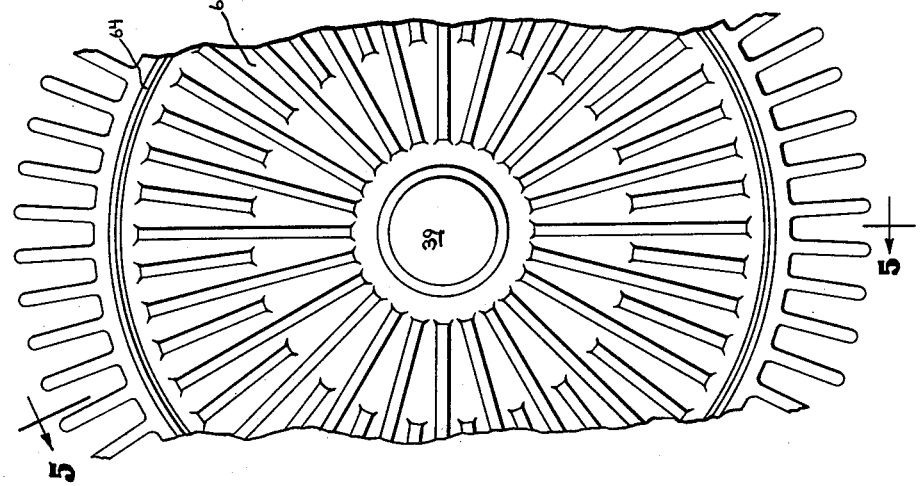
FIG. 4 is a fragmentary front elevation of a second embodiment of the invention, which embodiment incorporates a different means of mounting the thermally sensitive element.

Referring to FIGS. 4 and 5, wherein parts are identical to those in FIGS. 1-3 except as noted hereinafter, an alternate construction is shown. It will be remembered that in the first embodiment described, the thermal element is mounted on a bridge which is in turn secured to the housing. The pressure plate 29 has lugs 35 thereon which prevent rotation of the pressure plate with respect to the housing, these lugs being located so as to engage the bridge. In the second embodiment, illustrated in FIGS. 2, 4 and 5, the pressure plate 29a is provided with an aperture 60. A pin 62 secured in the housing 11a prevents rotation of the pressure plate with respect to the housing. A cover plate 61 including an array of fins 65 is secured to the housing and supports the thermal element 39. The outer circular edge 63 of the cover plate is received in the housing and secured and sealed in place by the inwardly turned annular flange 64. An aperture or apertures 68 are provided in the pressure plate to permit communication between the front and rear of the pressure plate 29a.

Presence of fluid on both sides of the pressure plate effects hydraulic pressure balance on the plate which assists the action of the thermal element 39.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A drive coupling comprising: a generally cup-shaped driven member and a drive disc mounted within and concentrically of said driven member for relative rotation therebetween; a closure plate closing the end of said driven member; a bulkhead moveable within said driven member toward and away from said drive disc and dividing said driven member into a chamber remote from said drive disc and a drive chamber enclosing said drive disc; fluid in said drive chamber; a temperature responsive element mounted exteriorly of said closure plate and operably connected to said bulkhead so as to shift said bulkhead with relation to said drive disc in response to temperature changes to thereby vary the volume of and hence the dynamic fluid level within said drive chamber thereby varying the fluid shear driving relationship between said driven member and drive disc, and an aperture in said bulkhead for permitting the dynamic fluid level to equalize within said remote chamber and said drive chamber to thereby balance the fluid pressures on opposite sides of said bulkhead.

2. A drive coupling comprising: a generally cup-shaped driven member and a drive disc mounted within and concentrically of said driven member for relative rotation therebetween; a closure plate closing the end of said driven member; a bulkhead moveable within said driven member toward and away from said drive disc and dividing said driven member into a chamber remote from said drive disc and a drive chamber enclosing said drive disc; fluid in said drive chamber; a condition responsive element operably connected to said bulkhead so as to shift said bulkhead with relation to said drive disc in response to changes in said condition to thereby vary the volume of and hence the dynamic fluid level within said drive chamber thereby varying the fluid shear driving relationship between said driven member and drive disc, and an aperture in said bulkhead for permitting the dynamic fluid level to equalize within said remote chamber and said drive chamber to thereby balance the fluid pressures on opposite sides of said bulkhead.

References Cited by the Examiner

UNITED STATES PATENTS 2,838,244   6/58   Oldberg.
3,019,875   2/62   Fowler.

DAVID J. WILLIAMOWSKY, *Primary Examiner.*